Nov. 23, 1965 R. T. ALLEMANN ETAL 3,218,781
ELECTROSTATIC APPARATUS FOR REMOVAL OF DUST
PARTICLES FROM A GAS STREAM
Filed Nov. 2, 1962 3 Sheets-Sheet 1
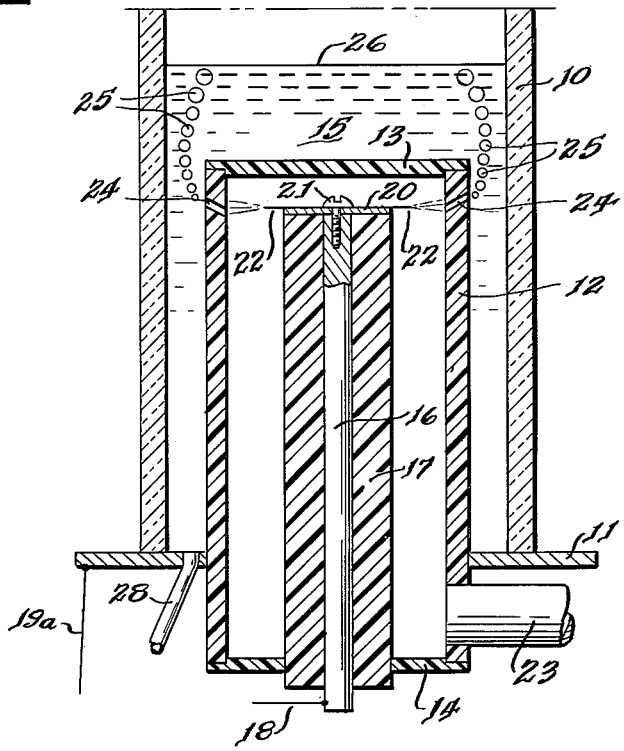
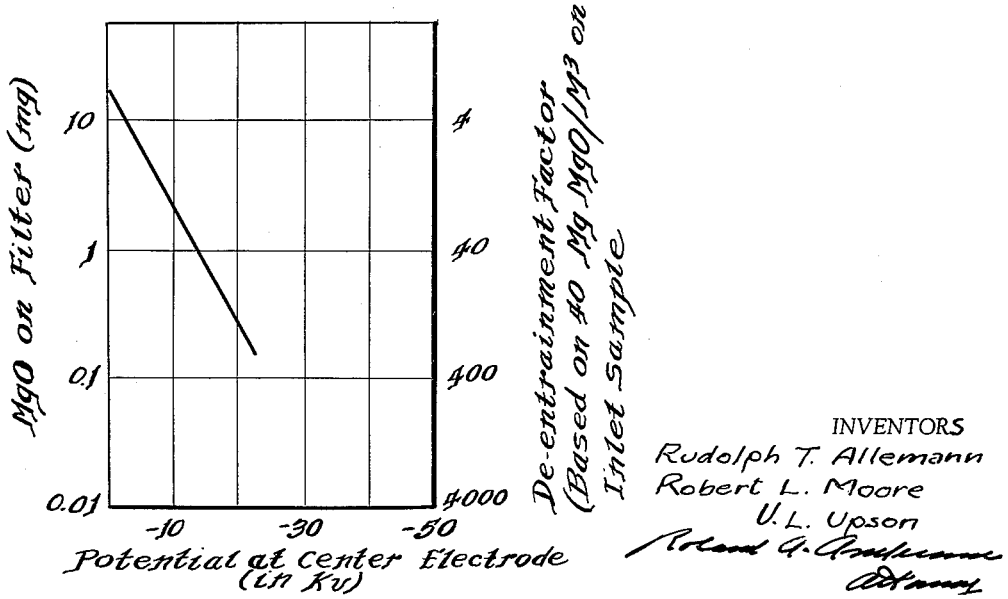
INVENTORS
Rudolph T. Allemann
Robert L. Moore
U. L. Upson

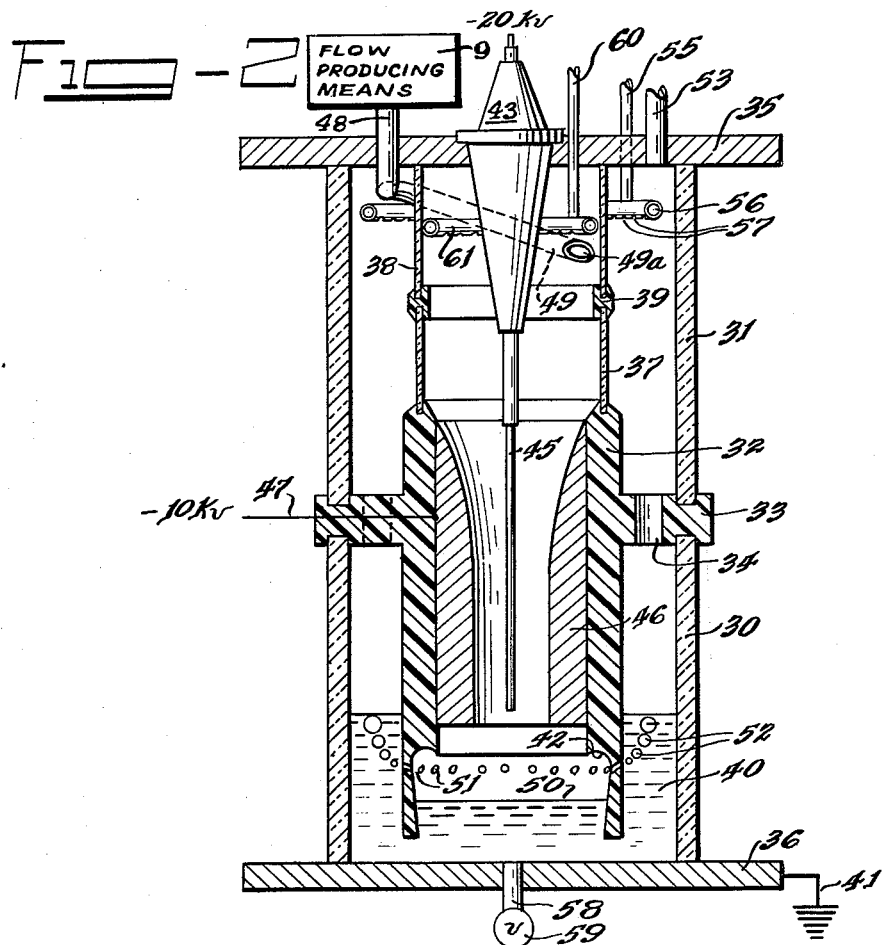
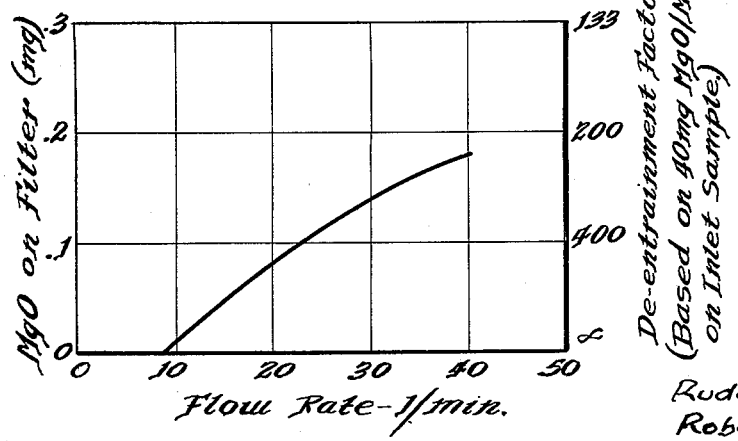

Nov. 23, 1965  R. T. ALLEMANN ETAL  3,218,781
ELECTROSTATIC APPARATUS FOR REMOVAL OF DUST
PARTICLES FROM A GAS STREAM

Filed Nov. 2, 1962  3 Sheets-Sheet 3

INVENTORS
Rudolph T. Allemann
Robert L. Moore
U. L. Upson

Roland A. Anderson
Attorney

United States Patent Office 3,218,781
Patented Nov. 23, 1965

3,218,781
ELECTROSTATIC APPARATUS FOR REMOVAL OF DUST PARTICLES FROM A GAS STREAM
Rudolph T. Allemann, Robert L. Moore, and U. L. Upson, Richland, Wash., assignors to the United States of America as represented by the United States Atomic Energy Commission
Filed Nov. 2, 1962, Ser. No. 235,166
2 Claims. (Cl. 55—122)

The invention relates to a novel apparatus of removing fine entrained dust particles from a gas stream, more particularly, to an apparatus of removing such particles under one micron in size in an environment of subatmospheric pressure, and to an apparatus for carrying it out. The invention described herein was made in the course of, or under, a contract with the U.S. Atomic Energy Commission.

The familiar industrial problem of removing undesirable dust particles from off-gas streams is particularly acute in the field of atomic energy. Dusts from atomic energy installations are often dangerously radioactive, which makes it necessary to remove the fine particles below one micron in size, and even those with as small a diameter as 0.01 micron. The problem is further complicated by the fact that, for safety reasons, handling of radioactive materials must be carried out in an environment of subatmospheric pressure, which rules out large pressure drops in dust removal apparatus within the environment.

The rigorous conditions just enumerated render unsatisfactory all commercial types of dust removal devices now known. Electrostatic precipitators have the advantage of not requiring a large pressure drop, but their efficiency decreases with respect to particles below one micron in diameter due to their re-entrainment in the gaseous stream as it passes the electrostatically charged plates. Wet plates have been tried, and while these decrease particle migration somewhat they are subject to arcing between the plates, and they aggravate the difficulties of cleaning out the radioactive material from the device to prevent clogging.

The only known method of thoroughly removing particles within the 1 to .01 micron range is to pass the gas stream through a so-called "absolute" filter, which is simply a physical filter fine enough and thick enough to trap the particles. While efficacious on a laboratory scale, this is too slow to be a satisfactory commercial method, and it is one that needs to be replaced if atomic energy is to become economically competitive with conventional sources of energy.

It is, accordingly, the general object of the invention to provide an apparatus for removing particles entrained in a gas stream.

It is a more particular object to provide an apparatus for removing from a gas stream entrained particles within the size range of 1 to .01 micron.

It is a more particular object to provide an apparatus for removing such particles with reasonable speed and with a sufficiently small pressure drop that the apparatus may be operated within an environment of subatmospheric pressure.

Further objects will appear as the description proceeds.

According to the invention a particle-laden gaseous stream is led through a field of electrical discharge, whereupon the particles entrained in the stream become individually charged, and thereafter the stream is led through small openings in a vessel containing a conductive liquid at a different electrical potential from that of the particles. On passing through the openings of the vessel and emerging into the liquid bubbles are formed, and because of the difference in potential between the particles and the liquid they are immediately attracted to the surface of the bubbles where they enter the liquid either by being dissolved or suspended; the gas within the bubbles is thereby scrubbed of its entrained particles and escapes from the top of the liquid without them. The conductive liquid, meanwhile, may be recirculated in and out of the vessel through a liquid circuit containing a separating means for removing the dissolved or suspended matter from the liquid stream. Because of the separating action which takes place on the surface of the bubbles, we have named the device of our invention the electrostatic bubble scrubber.

Reference is now made to the drawings, FIG. 1 of which is a sectional view of an embodiment of the invention employing two levels of electrical potential.

FIG. 2 is a sectional view of an embodiment of the invention employing three levels of electrical potential.

FIG. 3 is a graph in which the residual amount of magnesia entrained in a gas stream after passing through the electrostatic bubble scrubber is plotted against the potential of the central electrode of the embodiment of FIG. 2.

FIG. 4 is a graph showing the residual amount of magnesia in a gas stream after passing through the electrostatic bubble scrubber at different flow rates at constant potential difference.

Figure 5:
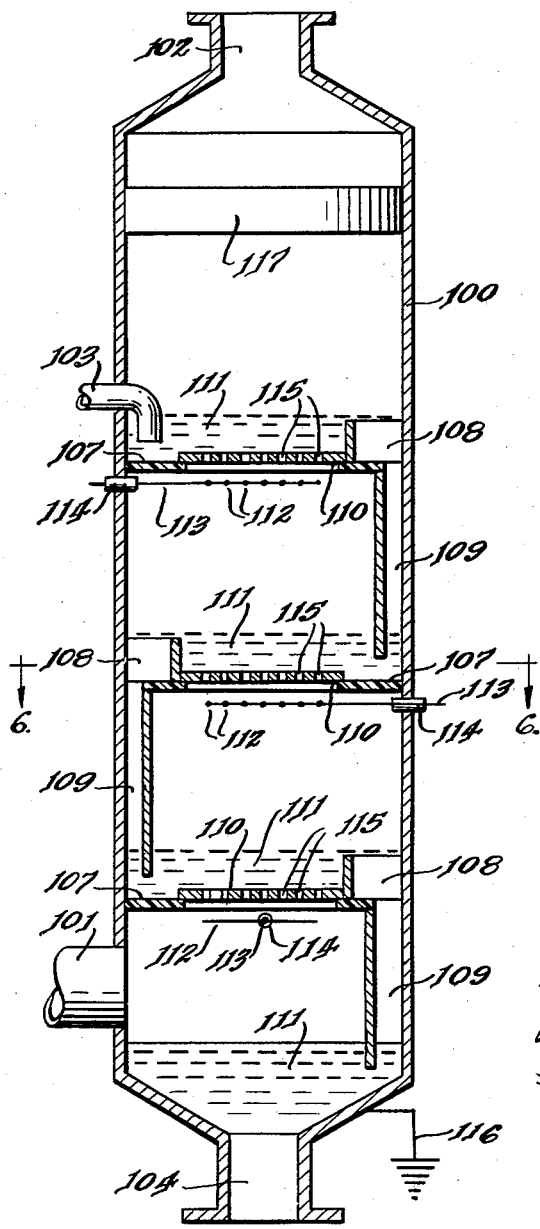
FIG. 5 is a vertical sectional view of a multiple stage embodiment of the invention employing two levels of electrical potential at each stage.

Referring to FIG. 1, the numeral 10 designates an outer enclosure of electrically insulative material such as glass and 11 an annular base of electrically conductive material such as stainless steel. The enclosure 10 may be circular and cylindrical. Coaxial with outer enclosure 10 is inner enclosure 12, having a top 13 and bottom 14. The enclosure 12 is formed of nonconductive material such as acrylic resin and may be circular and cylindrical. Electrically conductive liquid 15 such as water occupies the space within enclosure 10 above the top 13 and externally of the sides of enclosure 12. Coaxially located within inner enclosure 12 is a metallic conductor 16, encased in a tubular member 17 of insulating material such as acrylic resin and connected by a wire 18 to one side of a source of electric potential (not shown). The other side of the source is connected with the liquid 15 through a conductor 19a and the base 11. A metal disk 20 is secured to the top of conductor by a screw 21. A plurality of electrical discharge wires 22 of metal, bonded to the disk 20 are distributed circumferentially thereabout and extend radially outward thereof. The disk 20 and wires 22 may be of stainless steel.

Adjacent the bottom of enclosure 12 is a conduit 23 through which a gas such as air, argon, or helium and the particles entrained in the gas enter the enclosure 12. Adjacent the top of enclosure 12 at about the level of disk 20 and wires 22, is a plurality of small openings 24, which extend radially outwardly and upwardly through the enclosure 12 and are equal in number to the wires 22, one opening 24 being directly opposite each wire 22.

An electrical discharge is established between each wire 22 through the adjacent opening 24 and the liquid 15 by virtue of the connection of the liquid 15 and each wire 12 with opposite sides of the electric-potential source (not shown). Since the gas to be stripped of particles can escape from the enclosure 12 only by way of the openings 24, all the particles in the gas upon passing through openings 24 are charged, rapidly attracted to the walls of gas bubbles 25 formed on passage of the gas through openings 24 into liquid 15, discharged, and absorbed into the liquid 15. The bubbles 25, scrubbed to a high degree of the entrained particles, rise in the liquid 15 and burst on passing through a top surface 26 of the liquid into a space in the enclosure 10 thereabove, from which the gas is drawn. Short circuits between the liquid 15 and the electrode 16 cannnot occur, because the size of the openings 24 and the outward flow of gas in these openings prevent the liquid 15 from flowing through the openings into the enclosure 12.

Conductive liquid 15 is recirculated in and out of the space it occupies between enclosures 10 and 12 through outlet pipe 28 and an inlet pipe (not shown). It will be understood that a liquid circuit connects these and includes a stripping means whereby the dissolved or suspended matter from the gaseous stream is removed. However, since the details of this circuit are not a part of the invention, they are not shown.

Referring to FIG. 2, the numeral 30 designates a lower section of an outer enclosure of an embodiment of electrostatic bubble scrubber employing three levels of electrical potential. 31 is an upper section of the outer enclosure; both sections may be circular and cylindrical and are made of insulating material such as glass. Between the two is a tubular piece 32 of molded polyethylene which has an annular extension 33 which acts as a gasket between portions 31 and 32. Extension 33 has a plurality of openings 34 which connect the spaces within sections 30 and 31. A top 35 and base 36 are applied to the sections 31 and 30, respectively and are of metal such as stainless steel.

An inner enclosure coaxial with sections 30 and 31 is formed by the molded piece 32, short tubular members 37 and 38, and a gasket 39 therebetween. The member 37 is of non-conducting material such as glass. The member 38 is of metal such as stainless steel and may be joined to the top 35. The members 37 and 38 may be circular and cylindrical.

As will be seen in FIG. 2, the lower end of piece 32 is spaced from the base 36, thereby providing communication between the volumes defined by the inner and outer enclosures. Enclosure section 30 and base 36 form a vessel that contains a body of conductive liquid 40 such as water. The piece 32 extends into the liquid 40, and the level of the liquid within the piece 32 is lower than its level between the piece and the enclosure section 30. This is due to gas within piece 32 bearing down upon it under pressure. The space between the piece 32 and base 36 has the advantage of taking care of sudden surges of gas pressure, which can escape around the ends of the piece 32, thereby promoting safety. The conductive liquid is grounded through base 36 by ground conductor 41. An annular recess 42 of piece 32 will prevent splashing of liquid 40, as will become apparent as the description proceeds.

Projecting downward through the top 35 and electrically insulated therefrom by an insulator 43 is a central or inner wire electrode 45, which may, for example, be at a —20 kv. potential as shown by the legend. A hollow or tubular outer electrode 46, mounted in the piece 32, has an inner surface coaxial with the electrode 45, a large portion of which extends substantially the length of the electrode 46. The inner surface of electrode 46 is circular in section and has an upper portion decreasing in diameter in a downward direction and a lower portion of uniform diameter. The electrode 46 is at a potential appreciably different from that of electrode 45, for example —10 kv. applied to a conductor 47 connected with electrode 46. The electrodes 45 and 46 may be of stainless steel.

A gas line 48 connecting gas flow producing means 9, projects through the top 35 and curves at portion 49, which is connected generally tangentially to the member 38 at an opening therein so as to impart a swirling helical motion to the gas passing from the line 48 into the members 37 and 38 and electrode 46. Thus, channeling of the gas is minimized, and a uniform residence time is obtained.

Because of the difference in electric potential, a corona discharge is produced between electrodes 45 and 46 in the gas such as air, argon, or helium, supplied through line 48 as the gas passes between the electrodes. As above explained, the pressure of the gas gives the liquid 40 a lowered surface 50, which constitutes a low-efficiency, high-capacity, parallel-plate collector, since the liquid surface 50 is at ground potential because of the base 36 and the line 41.

The piece 32 has, just below the annular recess 42 and above the surface 50, a plurality of small radial openings 51, which are circumferentially distributed about the piece 32. The gas with its entrained particles coming down between the electrodes 45 and 46 passes outward through the openings 48 as bubbles 52, and the particles therein, being charged by virtue of the passage of the gas between electrodes 45 and 46, are immediately attracted to the interface between the bubbles and the liquid 40 and enter the liquid in suspended or solute form. The resulting scrubbed gas passes upward through the openings 34 and leaves the apparatus through a line 53. The size of the openings 51 and the pressure of the gas in the piece 32 are such as to prevent any of the conductive liquid 40 from flowing radially inwardly through the holes 51 into the piece 32. The surface 50 of the liquid 40 within the lower end of the piece 32 is depressed to the level shown in FIG. 2 by the pressure required for the gas to pass through the holes 51. The annular recess 42 forms a splash deflector to minimize grounding of the electrodes 45 and 46 during turbulent high flow.

Conductive liquid 40 is introduced to the apparatus through liquid intake line 55 and distribution ring 56. Ring 56 has a plurality of holes 57 which enable the incoming liquid to wash down the interior of sections 30 and 31 and the exterior of cylinders 37 and 39 and section 32. Drain line 58f controlled by valve 59, removes conductive liquid 40 from the apparatus. A liquid circuit, including a removal means, will be understood to connect lines 55 and 58, as in FIG. 1.

Liquid intake line 60 and distribution ring 61 similarly enable the interior of members 37 and 38 and electrodes 45 and 46 to be washed down. Liquid for this washing-down operation is supplied only when the gas stream and the electric potential sources are shut off.

Figure 6:
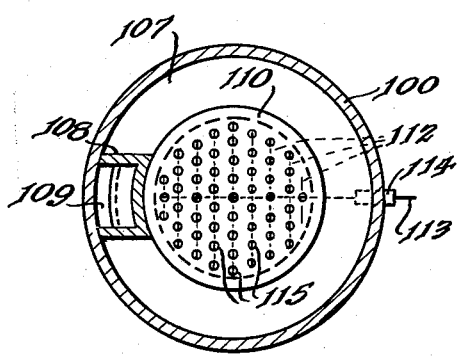
FIG. 6 is a horizontal sectional view taken on the line 6—6 of FIG. 5.

Referring to FIGS. 5 and 6, the numeral 100 designates a cylindrical shell of conductive material such as stainless steel, having a side opening 101 near the bottom for admitting the dust laden gas such as air, argon, or helium, and a top opening 102 for the exit of the scrubbed gaseous stream. A liquid-admitting conduit 103 is connected to the shell 100 so as to extend thereinto at a region of the side near but spaced from the top. A liquid drain opening 104 is provided at the bottom of the shell 100.

At vertical intervals along the inside wall of the enclosure 100 is a plurality of annular shelves 107, for example, three, attached to enclosure 100 as by welding. The shelves 107 have, adjacent the inner wall of enclosure 100, weirs 108 behind which are downcomers 109 in a staggered array as shown. Resting on the shelves 107 are a like plurality of perforated plates 110. The shelves 107, weirs 108, downcomers 109, and plates 110 are of electrically non-conductive material such as acrylic resin or of electrically conductive material such as stainless steel. The shelves 107 and plates 110 form bottoms for pools of conductive liquid 111 such as water which flows in zigzag fashion out of conduit 103 and thence over the top plate 110, across the top weir 108 and down the top downcomer 109 and back over the next plate 110 and so on. The weirs 108 maintain the level of the pools of the conductive liquid 111 even with their tops as shown. The downcomers 109 enter beneath the level of the pool just beneath them, which seals them off as a possible by-pass for the upward travelling gas stream.

Beneath each plate 110 lies a plurality of spaced parallel electrical discharge wires 112 which are parallel with one another and are connected to a conductor 113, which extends through a wall of the shell 100 in an insulator 114 so as to be insulated from the shell and is connected to a source of electric potential (not shown). Over each wire 112 lies a line of spaced openings 115 in the associated plate 110, the line of openings being parallel to the wire. The lines of openings 115 in each plate are parallel to and spaced from one another. The shell 100 is grounded at 116; this grounds the conductive liquid 111 at all levels.

The operation of the embodiment of FIGS. 5 and 6 is essentially the same as that of the embodiment of FIG. 1. Electrical discharge fields are set up between the wires 112 and conductive liquid 111 through the openings 115 in the plates 110. The dust laden gaseous stream passes upward from opening 101 past the electrical fields, the entrained particles become charged, and the stream bubbles through the openings 115 of each of the plates 110 into the conductive liquid 111 above them. Again the solid matter is attracted to the surface of the bubbles due to the difference in electrical charge between the particles and that of the grounded conductive liquid 111, and the solid matter passes into the liquid, thus scrubbing the gas leaving at opening 102. On the way to the opening 102 the scrubbed gas passes through a de-entrainer 117, which separates liquid droplets from the gas.

The conductive liquid 111 enters at opening 103 and flows, as already explained, through the staggered vertical array of pools, over the weirs and down the downcomers to the drain 104 where it enters an external liquid circuit (not shown) having a means for separating the solids and solutes acquired within the electrostatic bubble scrubber.

Figure 7:
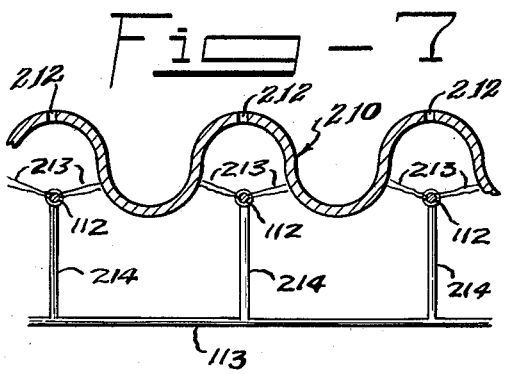
FIG. 7 is a fragmentary sectional view of a modified form of the embodiment of FIG. 5.

Referring to FIG. 7, the numeral 210 designates a variation of the plates 110 shown in FIG. 5. Each of the plates 210 differs from the plates 110 in being corrugated and being formed of conductive material such as stainless steel. Each of the downwardly opening channels formed by the corrugations has in its base, which is uppermost, a line of openings 212 which are directly over, and spaced along, the associated discharge wire 112, which lies in the mouth or open side of the channel. With this arrangement coronas 213 are produced between each discharge wire 112 and both sides of the associated channel in the plate 210. Thus, the tendency is for all particles as the gas passing through the plate openings 212 to pass through coronas 213. In this modification the conductor 113 is at a lower level with respect to the discharge wires than in the modification of FIGS. 5 and 6 so that coronas do not occur between the conductor 113 and the plate 210. The conductor 113 is connected with the discharge wire 112 by short wires 214.

In carrying out the invention it is preferable to remove the coarser particles, above one micron in size, by conventional dust removal means, such as a dry-plate electrostatic precipitator. After this has been done the electrostatic bubble scrubber should be used to remove the finer particles.

In operating embodiments of the invention employing two levels of electrical potential, such as those shown in FIGS. 1 and 5, we have found that the difference in levels may vary considerably. In general, dust removal becomes more efficient the greater the difference in levels, but when it becomes too great sparking occurs, which makes the device inoperative. A difference as small as 5,000 volts can be used, or it may be as large as 15,000 volts. We have had good results with a two-level device having an electrode at −10 kv. and the conductive liquid at ground level and feel that this difference is to be preferred; at this difference the preferred amperage is about 0.9 milliampere. This was able to reduce a dust loading from 300 to 20 micrograms of dust per cubic foot in a gaseous stream flowing at the rate of 20 liters per minute, which gives a decontamination factor of 15. This is in contrast to conventional devices which are unable to achieve a decontamination factor any better than about 1.5 within the 0.1 to 0.01 micron particle size range.

In operating embodiments of the invention employing three levels of electrical potential, such as that shown in FIG. 2, the same considerations as to voltage and amperage hold true in a general way as in two-level embodiments. Our preferred voltages are −20 kv. for the electrode of highest potential such as the inner rod electrode 45 of the embodiment in FIG. 2, −10 kv. for the intermediate electrode such as the outer tubular electrode 46, and zero, or ground level, for the conductive liquid 40. These potentials may be varied somewhat, but we have found that sparking is apt to occur when the potential difference exceeds 12 kv. between the tubular electrode 46 and the rod electrode 45 or 23 kv. between the rod electrode and the conductive liquid 40. These matters are dependent to a considerable extent on the geometry of the particular device that is being used, and the difference in voltage is a matter of operating practice rather than something going to the essence of our invention.

In any event, it is preferable that the electrodes, whether of two-level or of a three-level embodiment, be negatively charged rather than positively. This is in line with experience in the electrostatic precipitator art where negatively charged plates have been found to be more effective than positively charged ones. We prefer, too, that the conductive liquid be at zero, or ground level charge, although it is conceivable that in unusual cases this would not be true.

Our electrostatic bubble scrubber may be operated with a small pressure drop; a drop of about two inches of water for each stage is sufficient, which is well within the limits permissible in subatmospheric devices such as glove boxes, hot cells and caves. In multistage embodiments such as those shown in FIGS. 5 and 7, of course, each stage would increase the over-all pressure drop accordingly.

*Example I*

A two-level electrostatic bubble scrubber of the type shown in FIG. 1 was operated with the central electrode having a charge of 10,000 volts at 0.9 milliampere. A gaseous stream having a dust content of 300 micrograms per cubic foot passed through the device at the flow rate of 20 l./min. The dust particles in the gaseous stream were in the size range of 0.1 to 0.01 micron. Analysis of the gas stream emerging from the device showed it to have a dust content of 20 micrograms per cubic foot, which give a deentrainment factor of 15.

*Example II*

A three-level electrostatic bubble scrubber of the type shown in FIG. 2 had as the central electrode a twisted square rod, rather than a round rod, but otherwise was essentially like the device in the figure. In order to test its efficiency under various conditions magnesium ribbon was burned and the resulting smoke run through the device at varying potentials and flow rates as will be explained. The product of burned magnesium ribbon, MgO smoke, has a particle size under one micron and nearly identical with the size of calcined waste particles encountered in nuclear fuel reprocessing plants. After the air stream carrying the MgO smoke passed through the electrostatic bubble scrubber it was passed through filter paper, and each three minutes the paper was withdrawn, and fresh one substituted and the withdrawn paper was analyzed for MgO by flame photometry. The blank value of the filter paper was 0.01 to 0.02 mg. MgO.

In the first of a series of experiments the central electrode was run at voltages varying from zero to −22 kv., with the annular electrode maintained at a voltage of 30% of the central electrode's voltage. The flow rate of the air laden with magnesium ribbon smoke was 37 liters per minute throughout this experiment. FIG. 3 is a graph in which the logarithms of the milligrams of MgO found on the paper was plotted as ordinates against the voltages of the central electrode as abscissae; since the plot is semilogarithmic, it appears that the removal of particles from the gas stream is exponential with the potential at the central electrode.

*Example III*

In the second series of experiments referred to in Example II the voltage of the central electrode was held constant at −20 kv., and the flow rate of the air and entrained smoke was varied; otherwise conditions were identical with those in Example II. FIG. 4 is a graph in which the flow rate in liters per minute is plotted against the milligrams of MgO found on the paper. Since this is not logarithmic it appears that between the flow rates of 10 and about 39 l./min. the MgO passing through the device is approximately linear with the flow rate.

Comparison of the MgO content of the gas stream before and after passing through the electrostatic bubble scrubber of the three-level type, with the central electrode at −20 kv. and the flow rate at 1.3 ft.³/min. yielded a de-entrainment factor of 260.

It will be understood that this invention is not to be limited to the details given herein, but that it may be modified within the scope of the appended claims.

What is claimed is:

1. An apparatus for removing particles entrained in a gas stream from the stream comprising first and second electrodes spaced apart with respect to each other, electrical potential establishing means constructed and arranged for establishing an electrical potential gradient between said electrodes sufficient to effect a corona discharge therebetween, said electrical potential establishing means comprising a first source of electrical potential and a second source of electrical potential of the same sign and lesser value than said first source but above ground potential, said first electrode being electrically connected to said first source of electrical potential, said second electrode being electrically connected to said second source of electrical potential, an electrically conductive enclosure, an electrically conductive liquid contained within said enclosure, means constructed and arranged for applying a ground potential to said liquid, an electrically nonconductive enclosure having a plurality of openings through the base thereof, the base of said electrically nonconductive enclosure together with the openings therethrough being submerged in said liquid, said electrically nonconductive enclosure being disposed about said electrodes and the space therebetween to effect electrical insulation between said electrodes and said liquid, and gas moving means constructed and arranged for flowing said gas through the corona discharge between said electrodes and then through the openings in the base of said electrically nonconductive enclosure into said liquid, said gas moving means constructed and arranged to produce sufficient pressure in said flowing gas stream and said openings being of a sufficient size to admit said gas stream into the liquid in said electrically conductive enclosure as bubbles but to prevent escape of said liquid from said electrically conductive enclosure into the electrically non-conductive enclosure through said openings.

2. Apparatus for removing particles entrained in a gas stream from the stream comprising a first electrical source of negative potential, a central electrode electrically connected to said first source, a second electrical source of negative potential intermediate the potential of said first source and electrical ground, an outer tubular electrode electrically connected to said second source and surrounding said central electrode in radially spaced coaxial relationship therewith, the electrical potential gradient between said electrodes being sufficient to effect a corona discharge therebetween, an electrically conductive enclosure, an electrically conductive liquid contained within said enclosure, means constructed and arranged for electrically grounding said liquid, an electrically nonconductive tubular member having a plurality of openings through the base thereof of said tubular member being spaced apart from the base of said enclosure, the base of said electrically nonconductive member together with the openings therethrough being submerged in said liquid, said electrically nonconductive member being disposed about and in supporting relation to said outer tubular electrode to effect electrical insulation between said electrodes and said liquid, and gas giving means constructed and arranged for moving said gas through the corona discharge between said electrodes and then through the openings in the base of said electrically nonconductive enclosure into said liquid, said gas moving means constructed and arranged to produce sufficient pressure in said flowing gas stream and said openings being of a sufficient size to admit said gas stream into the liquid in said electrically conductive enclosure as bubble but to prevent escape of said liquid from said electrically conductive enclosure into the electrically nonconductive tubular member through said openings and to depress the level of the liquid within said tubular member to a point below the openings therein but above the bottom of said tubular member.

References Cited by the Examiner

UNITED STATES PATENTS

| | | | |
|---|---|---|---|
| 1,329,844 | 2/1920 | Meston | 55—10 |
| 1,358,031 | 11/1920 | Smith | 55—2 |
| 1,508,331 | 9/1924 | Huber | 55—13 |
| 1,594,324 | 7/1926 | Payne | 261—151 X |
| 2,153,599 | 4/1939 | Thomas | 55—122 X |
| 2,209,798 | 7/1940 | Subkow. | |
| 2,286,786 | 6/1942 | Cloyd | 261—114 |
| 2,339,561 | 1/1944 | Durrum | 261—114 |
| 2,357,355 | 9/1944 | Penney | 55—107 |
| 2,621,754 | 12/1952 | Doyle | 55—7 |
| 2,631,688 | 3/1953 | Osborne et al. | 55—122 |
| 2,800,193 | 7/1957 | Beaver | 55—115 |
| 2,814,360 | 11/1957 | Beaver | 55—119 X |
| 2,864,458 | 12/1958 | De Graaf et al. | 55—118 X |
| 2,884,236 | 4/1959 | Maille | 261—114 |
| 2,912,377 | 11/1959 | Lehrian | 261—114 X |
| 2,949,168 | 8/1960 | Peterson | 55—107 |

FOREIGN PATENTS

| | | |
|---|---|---|
| 529,210 | 9/1921 | France. |
| 1,078,096 | 3/1960 | Germany. |

HARRY B. THORNTON, *Primary Examiner.*
ROBERT F. BURNETT, *Examiner.*